United States Patent [19]

Neff et al.

[11] Patent Number: 5,446,323
[45] Date of Patent: Aug. 29, 1995

[54] ACTUATOR WITH TRANSLATIONAL AND ROTATIONAL CONTROL

[75] Inventors: Edward A. Neff, Rancho Santa Fe; John Moss, San Bernardino, both of Calif.

[73] Assignee: Systems, Machines, Automation Components Corporation, Carlsbad, Calif.

[21] Appl. No.: 304,235

[22] Filed: Sep. 12, 1994

Related U.S. Application Data

[63] Continuation of Ser. No. 231,703, Apr. 22, 1994, which is a continuation-in-part of Ser. No. 24,503, Mar. 1, 1993, Pat. No. 5,315,189, which is a continuation-in-part of Ser. No. 996,893, Dec. 28, 1992, Pat. No. 5,317,222, which is a continuation-in-part of Ser. No. 765,130, Sep. 25, 1991, Pat. No. 5,175,456.

[51] Int. Cl.$^6$ .......................................... H02K 41/00
[52] U.S. Cl. ............................ 310/12; 29/834; 318/115
[58] Field of Search ............... 310/12, 13, 14; 29/739, 29/740, 741, 743, 744, 834

[56] References Cited

U.S. PATENT DOCUMENTS

| | | | |
|---|---|---|---|
| 4,421,997 | 12/1983 | Forys | 310/12 |
| 4,498,023 | 2/1985 | Stout | 310/14 |
| 4,575,652 | 3/1986 | Gogue | 310/14 |
| 4,587,466 | 5/1986 | Berg et al. | 318/38 |
| 4,653,794 | 3/1987 | Atlas | 294/88 |
| 4,739,241 | 4/1988 | Vachtseuanos et al. | 318/800 |
| 4,759,124 | 7/1988 | Snyder et al. | 29/834 |
| 4,809,430 | 3/1989 | Maruyama et al. | 19/834 |
| 4,922,434 | 5/1990 | Fule | 364/513 |
| 5,051,635 | 9/1991 | Kashara | 310/80 |
| 5,086,556 | 2/1992 | Toi | 29/740 |
| 5,086,559 | 2/1992 | Akatsuchi | 29/834 |
| 5,134,326 | 7/1992 | Sakamoto | 310/14 |
| 5,163,728 | 11/1992 | Miller et al. | 294/99.1 |
| 5,172,468 | 12/1992 | Tanaka et al. | 29/721 |
| 5,175,456 | 12/1992 | Neff et al. | 310/13 |
| 5,195,235 | 3/1993 | Mifuji | 29/721 |
| 5,206,985 | 5/1993 | Tsukihashi et al. | 29/720 |
| 5,210,933 | 5/1993 | Miyanishi et al. | 29/741 |
| 5,228,732 | 7/1993 | Rauscher | 294/2 |
| 5,251,946 | 10/1993 | Rossmeisl et al. | 294/64.1 |
| 5,315,189 | 5/1994 | Neff et al. | 310/12 |
| 5,317,222 | 5/1994 | Neff et al. | 310/13 |

OTHER PUBLICATIONS

IBM Technical Disclosure Bulletin, vol. 15, No. 3, Aug. 1972, p. 749.

Primary Examiner—Thomas M. Dougherty
Assistant Examiner—Judson H. Jones
Attorney, Agent, or Firm—Nydegger & Associates

[57] ABSTRACT

An apparatus for precisely moving and positioning a manufacturing component includes a housing on which a magnet is mounted. An electrical coil is wound around a coil piston which is slidingly mounted on the housing for movement within the magnetic field generated by the magnet. A rod, having a member for gripping the component, is attached for translational movement with the coil piston, and a source of electrical current is connected to the coil which is wrapped around the coil piston. A pneumatic rotary actuator is mounted on the apparatus, and a coupling connects the rotary actuator to the grip for rotation of the grip as desired. A vacuum source can be connected to the grip to allow picking up a fragile workpiece. In the operation of the apparatus, a current is selectively passed through the coil. This current in the coil then moves the coil piston and the attached grip within the magnetic field to position the component as desired in translation. Also, the rotary actuator can be activated to move the grip in rotation as desired. Additionally, position sensors can be mounted on the apparatus to determine the location of the coil piston, and a controller can be incorporated in the apparatus to use this position determination for controlling movement of the coil piston and the attached grip in translation and rotation.

21 Claims, 9 Drawing Sheets

ACTUATOR WITH TRANSLATIONAL AND ROTATIONAL CONTROL

CROSS REFERENCE TO RELATED APPLICATIONS

This is a continuation of continuation-in-part application Ser. No. 08/231,703, entitled "Improved Actuator With Translational and Rotational Control", filed Apr. 22, 1994, which is a continuation-in-part of application Ser. No. 08/024,503, entitled "Actuator With Translational and Rotational Control", filed on Mar. 1, 1993, now U.S. Pat. No. 5,315,189, which is a continuation-in-part of application Ser. No. 07/996,893, entitled "Working Transporter Device With Replaceable Grip", filed on Dec. 28, 1992, now U.S. Pat. No. 5,317,222, which is a continuation-in-part of application Ser. No. 07/765,130, entitled "Workpiece Transporter", filed on Sep. 25, 1991 now U.S. Pat. No. 5,175,456.

FIELD OF THE INVENTION

The present invention pertains generally to machines which are useful for the automated assembly of products. More specifically, the present invention pertains to apparatus and devices which are useful for inspecting, assembling and positioning component parts in a product assembly process. The present invention is particularly, but not exclusively, useful as an apparatus for the quick movement and precise positioning of relatively fragile component parts, in an appropriate translational and rotational alignment, during an automated assembly procedure while generating both extremely light forces and normal forces on the component parts.

BACKGROUND OF THE INVENTION

Numerous devices which are useful for the automated assembly of products have been successfully used for many years. In each instance, automated assembly devices have been employed with a view toward increasing the efficiencies and accuracies of the methods, procedures and processes which are followed during the manufacture and the assembly of a completed product. Indeed, the vast majority of consumer products are now manufactured on assembly lines which incorporate automated assembly devices.

It is easy to appreciate that as the complexity of a manufactured product increases, there may also be a commensurate increase in the complexity of the machines that are required to manufacture the product. This is particularly so where the component parts are delicate or fragile and precision is important. For example, many products require the precise positioning and assembly of extremely small and light weight components in their manufacture. More specifically, these operations require precision in both the linear translational movement of the component into position and in the force with which the component is moved and assembled with other components. Rotational movements of the component can often be acceptably accomplished with a lower degree of precision. For instance, some operations require only that rotational movements of approximately 90° or 180° be accomplished.

Furthermore, for quality control purposes it is often necessary that there be some way to obtain a real time check on the precision with which the component was positioned during the assembly of the product. Where very small, fragile or light weight components are being used in the manufacturing process, and where either very light forces or normal forces are required for the assembly of these components these considerations become very important.

Of the known devices which are typically used for automated assembly, systems incorporating solenoids can be quite precise. However, the forces which solenoids impose on components during their handling of the component can be destructive to the component or be otherwise unacceptable. One other general type device, the well-known stepper motor, also deserves some mention. Generally, stepper-motor systems can be spatially precise in their operation, and the forces which they generate can be effectively controlled. Stepper-motors, however, are bulky items and do not have good light force generation characteristics. In some manufacturing procedures these factors can be of significant disadvantage. Pneumatic devices are not known for performing with high precision, primarily because of their damping characteristics. However, they are sometimes suitable for achieving some modes of motion in a precision device. An example of this is in a transporter device in which the only required rotational movement of the assembly component is a rotation of approximately 90° or 180° without high precision. Such a need might arise in the assembly of a component which incorporates self aligning features, or in the placing of a component on a conveyor belt for packaging. Consequently, the present invention has recognized that an electronically operated system can be effective for the precise placement of a product component during assembly without encountering the force and spatial problems confronted by the above discussed types of systems. The present invention also recognizes that, in some applications of a precision transporter apparatus, the rotational mode of motion can be adequately and economically accomplished by the use of a pneumatically driven rotary actuator. More specifically, the present invention recognizes that a voice coil linear motor can be applied for these purposes, and that a pneumatic rotary actuator can be coupled with the voice coil linear motor, to accomplish certain high tolerance rotational motion.

While U.S. Pat. No. 4,498,023 which issued to Stout for an invention entitled "Voice Coil Linear Motor with Integral Capacitor" addresses some of the issues which are of concern to the present invention, it does not address all of the important issues. For example, the present invention is concerned with maintaining precise concentricity between the parts of the device as they move relative to each other. Stout does not precisely address this problem. Further, the present invention envisions a compact configuration for the device which may not be attainable with the cylindrical coil disclosed for the Stout device. Additionally, due to the suggested magnet strengths, a device such as the one disclosed in U.S. Pat. No. 4,498,023 can expect to have heat generation problems which drastically effect the proposed sensors accuracy thereby rendering the device ineffective.

The present invention also recognizes there are instances when it is important that a work product be both precisely moved in a translational motion, and oriented rotationally, but with a higher degree of tolerance. Further, there are instances when it is necessary for the work product to be rotated to join the work product to another component such as when it is necessary to thread or screw one component into another.

In addition to the advantages alluded to above, an electronic system has other characteristics which can be advantageous for a device which is to be used in the automated assembly of an end product. For example, some electronic system can rather easily lend itself to compact configurations. Further, an electronic system is responsive and can be configured to provide signals which can be used to monitor and control the operation of the system.

It has also been recognized that many components are relatively fragile, and that such components should not be subjected to compressive forces by a gripping means. Finally, it has been recognized that it can be advantageous to have a gripping means which can grip a variety of different shapes and release them with great precision, without imparting directional forces such as those which can result from typical grasping mechanisms.

In light of the above, it is an object of the present invention to provide a device for moving, inspecting and positioning a component in an automated assembly operation which is capable of picking-up, transporting and depositing fragile and light weight components. It is another object of the present invention to provide a device for moving and positioning a component in an automated assembly operation which has effective control of either extremely small forces or normal forces, and which can control such forces within a relatively fast response time. Yet another object of the present invention is to provide a device which can transport assembly components with minimal bounce (i.e. little, if any, changes in linear direction) at the end of a component placement operation. Still another object of the present invention is to provide a device for moving, inspecting and positioning a component in an automated assembly operation which can be effectively monitored for real time verification of operational accuracy. Yet another object of the present invention is to provide a device for moving and positioning a component in an automated assembly operation wherein there is appropriate control over both the translational and rotational positioning of the work piece being transported, and which can grip a component without applying compressive forces on the component, and without imparting directional forces on the released component. Another object of the present invention is to provide an automated assembly device which is relatively simple to use, is relatively easy to manufacture and is comparatively cost effective.

SUMMARY OF THE INVENTION

An apparatus for transporting and positioning a workpiece in an automated assembly procedure includes a housing, with a magnet fixedly mounted on the housing to establish a magnetic field within the housing. The magnet is preferably a rare earth magnet and is formed with a projection that extends through the central chamber of the housing. A coil piston, formed with an open passageway, is slidingly mounted on the housing and is positioned to surround the magnet with the projection of the magnet extending through the passageway. For an alternate embodiment of the present invention, a plurality of magnets can be mounted on the housing and the coil piston can be slidingly mounted on the housing for reciprocation in the magnetic field between the magnets. In either case, a conductive wire is wrapped around the coil piston to create a coil assembly.

In accordance with the present invention, the apparatus also includes a grip which is mounted on the coil piston to hold the workpiece or product component during its transfer from a supply source into position for product assembly. Preferably, the grip is a hollow rod which is mounted on the coil piston for linear movement with the coil piston and for rotation on the coil piston about the longitudinal axis of the rod. For one embodiment of the apparatus the grip can have an end piece which is operable to grasp the workpiece or component to be moved. In an alternate embodiment for the apparatus, a vacuum source can be operatively connected with the rod to create a suction through the hollow rod that holds the workpiece or product component against the rod during transport. The rod is rotatably mounted within a sleeve, with the vacuum being applied to the interior of the rod via the sleeve. The sleeve is sealed against the piston, and the rod is sealed against the sleeve, to prevent vacuum leakage.

For the operation of the apparatus of the present invention, a source of electrical current is provided and is connected directly to the coil of the coil assembly. Electrical currents from this source are passed through the coil as desired by the operator. Because the coil is disposed in the magnetic field that is generated by the magnet, current flow through the coil creates a force on the coil piston. This force then moves the coil piston and the grip relative to the housing. Additionally, the apparatus itself can be moved in any manner well known in the art, and the concerted action of apparatus movement and the movement of the grip relative to the rest of the apparatus can be used to transport a workpiece or a product component from one location to another.

A position sensor can be mounted on the housing of the apparatus to detect the location of the coil piston, and hence the translation position of the grip, relative to the housing. As intended for the present invention, the sensor can be either a relatively uncomplicated capacitive type sensor or, preferably, a more sophisticated optical encoder. In any case, the translational position sensor can be used to calibrate movement of the grip and to establish its start and stop points. Further, signals generated by the translational position sensor can be used to control the operation and translational movement of the coil piston and to inspect the result of the operation of the apparatus. To do so, the apparatus can be modified to include a microprocessor which compares the actual position of the coil piston (as indicated by the position sensor) with a preset desired position of the coil piston (in accordance with programmed input). This comparison will generate an error signal. Depending on the magnitude of this error signal, control of the coil piston can be accomplished by moving the coil piston in a manner which will reduce the error signal to zero. This, of course, is done if control is the objective. On the other hand, if inspection and quality control are the objectives, the error signal can be maintained and the assembled product rejected if the error signal exceeds the established tolerance.

The apparatus provides for both translational and rotational control over both the movement and positioning of the product component. The intent here may be not only to properly align the product component, but to also provide for the capability of screwing or threading the product component into another component of the product being assembled. In order to provide a rotational capability for the grip, one embodiment of the present invention includes a pneumatic rotary actuator which is mounted on the coil piston for translational movement with the coil piston. The output shaft of the rotary actuator is connected to the grip of the apparatus by a coupling, to cause rotation of the grip upon activation of the rotary actuator. Where a vacuum grip is used, the vacuum passage is sealed while still allowing relative rotation of the grip.

An encoder is also provided which is positioned to detect the angular displacement of the grip relative to a predetermined reference. More specifically, an encoder wheel is attached to the grip rod and an optical encoder is mounted on the coil piston. The microprocessor is electronically connected to the optical encoder and uses signals generated by the optical encoder to ascertain the angular position of the grip rod. In accordance with signals from the microprocessor, the rotary actuator is actuated to rotate the grip rod. Thus, signals from the microprocessor can be used to rotationally orient the product component. Further, in accordance with predetermined instructions concerning number of rotations or allowable torque limits, signals from the microprocessor can be used to rotate the product component to thread or screw the work component into another component.

The novel features of this invention, as well as the invention itself, both as to its structure and its operation will be best understood from the accompanying drawings, taken in conjunction with the accompanying description, in which similar reference characters refer to similar parts, and in which:

DESCRIPTION OF THE PREFERRED EMBODIMENT

Figure 1:
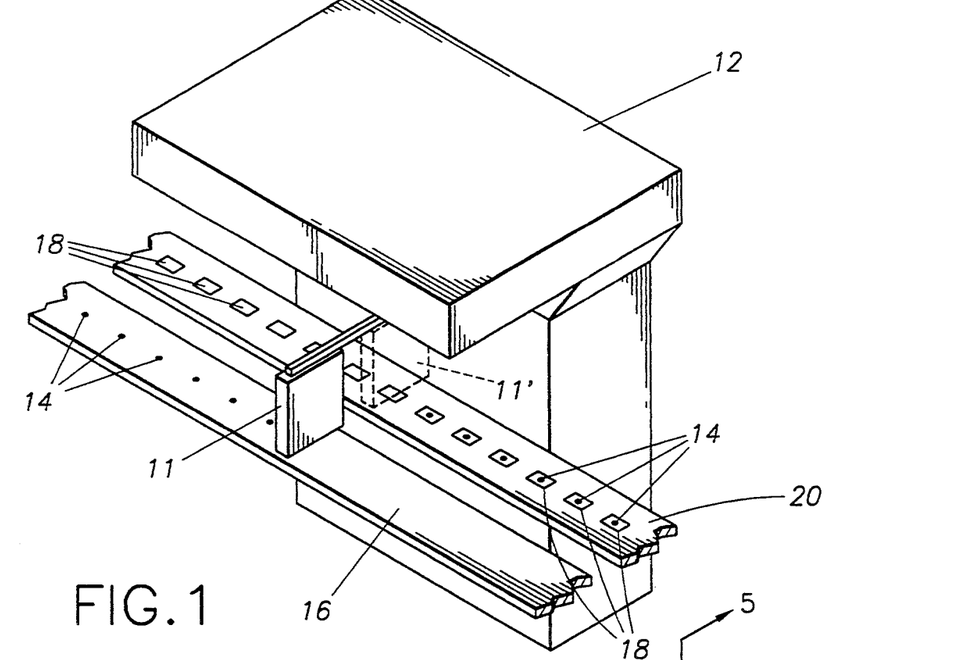
FIG. 1 is a perspective view of the present invention in its operative environment.

Referring initially to FIG. 1, the apparatus of the present invention, for moving and positioning an assembly component in an automated assembly operation, is shown in its intended environment and is designated 11. As shown, the device 11 is operatively mounted on an automated assembly machine 12 for movement between a position wherein the device (designated 11) retrieves a component 14 from a conveyor 16 and transports the component 14 to a position wherein the device (designated 11') places the component 14 into engagement with another end product component 18. After their assembly, the combination of components 14 and 18 is then taken by a conveyor 20 to a subsequent workstation where it is packaged or further combined with other components (not shown). As far as the device 11 and its operation is concerned, it is to be appreciated that the machine 12 shown in FIG. 1 is only exemplary. Indeed, the device 11 can be mounted on a variety of machines (not shown) for movement between a plurality of preselected positions.

Figure 2:
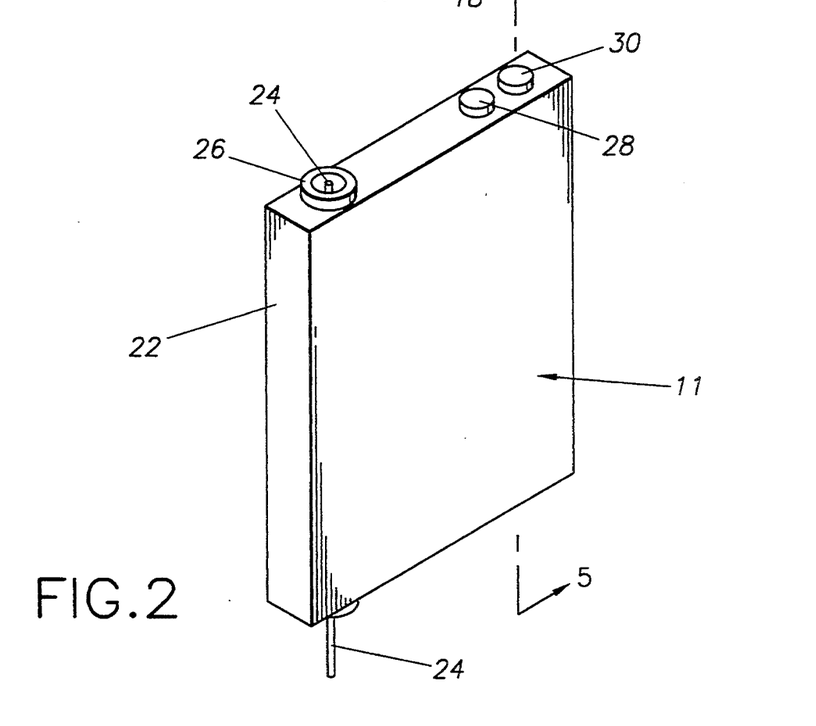
FIG. 2 is a perspective view of an embodiment of the present invention.

In FIG. 2 it is seen that the device 11 includes a housing 22 which is relatively compact, and is configured and dimensioned to be comparatively flat. Importantly, though not shown in the Figures, this configuration allows the device 11 to be easily stacked with other such devices for improved efficiency in an automated assembly operation. FIG. 2 also shows that a grip (or rod) 24 is mounted on the housing 22. Specifically, for the present invention, the rod 24 is preferably an elongated tubular member which is slidingly mounted on the housing 22 and which extends through the housing 22 substantially as shown. It will also be seen in FIG. 2 that the housing 22 is provided with an attachment 26, and with an electrical connector 28 and a sensor connector 30. Insofar as the rod 24 is specifically concerned, the rod 24 is slidingly mounted on the housing 22 between the attachment 26 and a bearing 27 (see FIG. 4) which is located on the housing 22 opposite from the attachment 26. Further, as so mounted, the rod 24 can be rotated about its longitudinal axis if desired.

Figure 3:
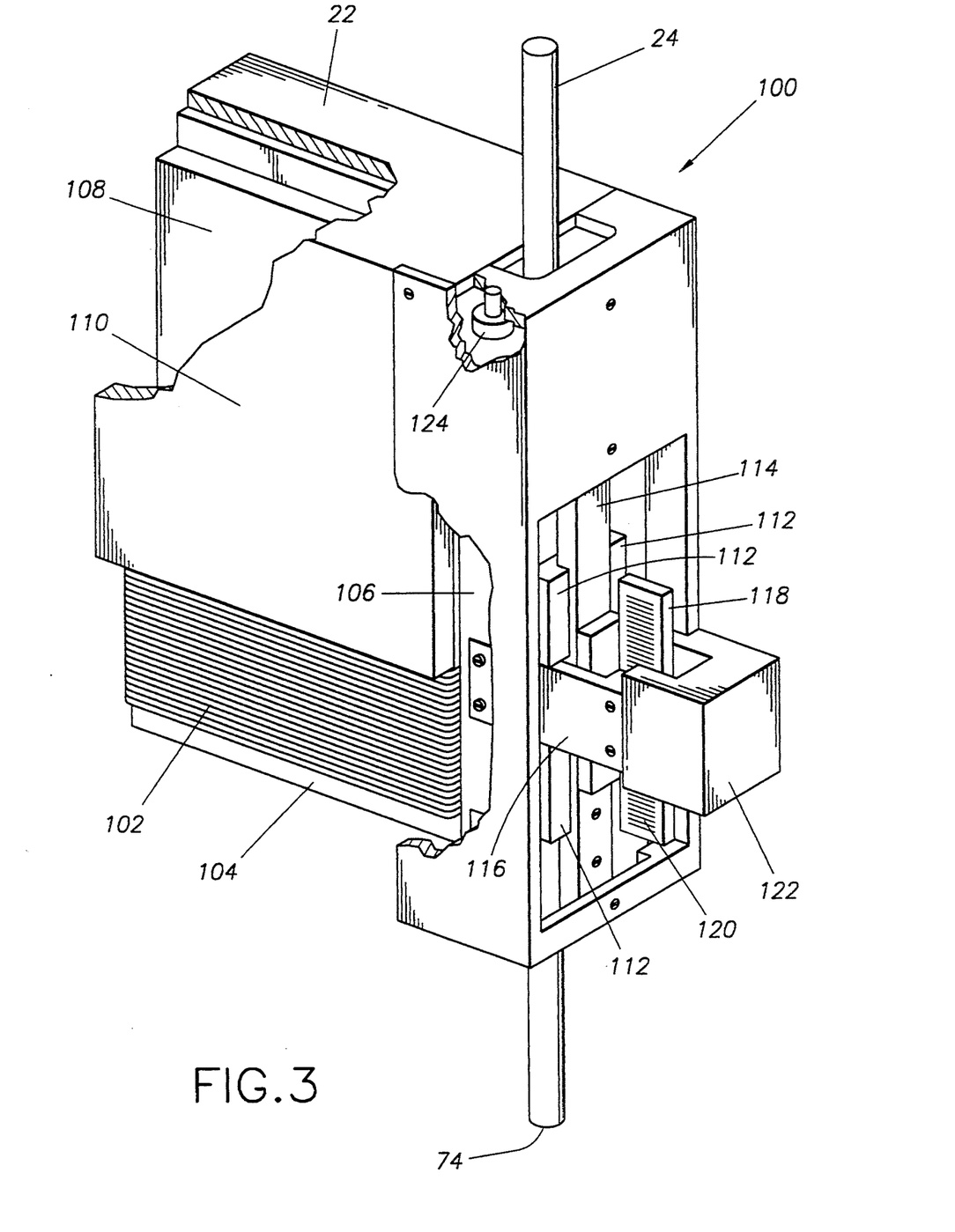
FIG. 3 is a perspective view of an alternate embodiment of the present invention with portions removed and portions broken away for clarity.

Referring to FIG. 3, the present invention is shown and generally designated 100. This embodiment of apparatus 100 includes an electrical coil 102 which is shown here to be in a substantially flattened configuration. The actual shape of coil 102, however, is of minimal importance and will in large part be determined by the desires of the manufacturer. In fact, coil 102 could have been shown to be cylindrically configured. In any case, the windings of coil 102 must somehow be configured to surround a hollow space.

FIG. 3 shows the coil 102 wrapped around an extension 104 of a coil piston 106. Although this embodiment of apparatus 100 shows a particular structure around which the coil 102 is wrapped, the skilled artisan will appreciate that coils are commercially available which do not require such structure. Such coils may, of course, be used with the present invention. Regardless, it is important that the coil 102 be physically attached to the coil piston 106 and able to move with the coil piston 106. Further, it is important for the present invention that the grip 24 be operatively attached to the coil piston 106 and able to move with the coil piston 106.

A magnet 108 is shown attached to the housing 22 of apparatus 100 and a magnet return 110 is also shown attached to the housing 22 and distanced from the magnet 108 so that an effective flux field is established as the environment for the coil 102. Preferably, magnet 108 is a rare earth magnet having a permanent magnetic capability of 35 MEG oersted. As intended for the present invention, the coil 102 may either surround the magnet 108 or, as discussed below for an alternate embodiment of the invention, the coil 102 may be positioned for movement between a plurality of magnets. This establishes a cooperation between the coil 102, the magnet 108 and the magnet return 110 in which a portion of the coil 102 is able to move between the magnet 108 and the magnet return 110.

The coil piston 106 is fixedly attached to a linear bearing 112 and the linear bearing 112 is slidingly mounted on a bearing rail 114. The bearing rail 114, in turn, is fixedly mounted to the housing 22. This arrangement allows the linear bearing 112 with its attached coil piston 106 and coil 102 to slidingly move within the housing 22. Consequently, because the windings of coil 102 are oriented substantially perpendicular to the flux field generated by the magnet 108, the application of an electrical current to the coil 102 will generate a force on the coil piston which causes the coil assembly (i.e. coil 102 and coil piston 106) to move within housing 22. This movement needs to be monitored and controlled. Additionally, as indicated above, for the embodiment of a device 11 having the capability of moving grip/rod 24 in both translation and rotation, there needs to be some means for independently controlling these movements. The translational movement and control of grip/rod 24 is discussed first, the rotational movement and control of grip/rod 24 is discussed subsequently.

Control over the movement of coil 102, and thus control over the grip 24, is achieved by monitoring the position of coil piston 106 relative to the housing 22. This is done using an encoder 122, such as a model SRL 4 encoder manufactured by Dynamics Research Corporation which is fixedly attached to the housing 22. More specifically, for apparatus 100, a bracket 116 is fixedly attached to linear bearing 112 and a glass encoder slide 118, with a scale 120 etched or printed thereon, is fixedly attached to the bracket 116. Accordingly, glass encoder slide 116 moves together with both linear bearing 112 and coil piston 106. In a manner to be subsequently discussed in greater detail, the apparatus 100 uses information from the encoder 122 regarding the position of glass slide 118 to precisely fix the position of coil piston 106, and thus the position of grip 24, relative to housing 22. Using this arrangement, accuracies on the order of five hundredths of a millimeter (0.05 mm) have been attained for determining the actual position of rod 24. Additionally, rod 24 can have a magnet (not shown) which is mounted on the rod 24 for movement therewith. Another magnet 124, shown fixedly mounted on the housing 22 is electrically activated to magnetically engage with the magnet on rod 24 to hold the rod 24 and its associated coil assembly in a detent or withdrawn configuration during the idle time for the apparatus 100. The position of either the magnet on rod 24 or the magnet 124 can be adjusted to allow proper engagement of the rod 24 with the housing 22 in the detent position for rod 24.

Figures 4, 5:
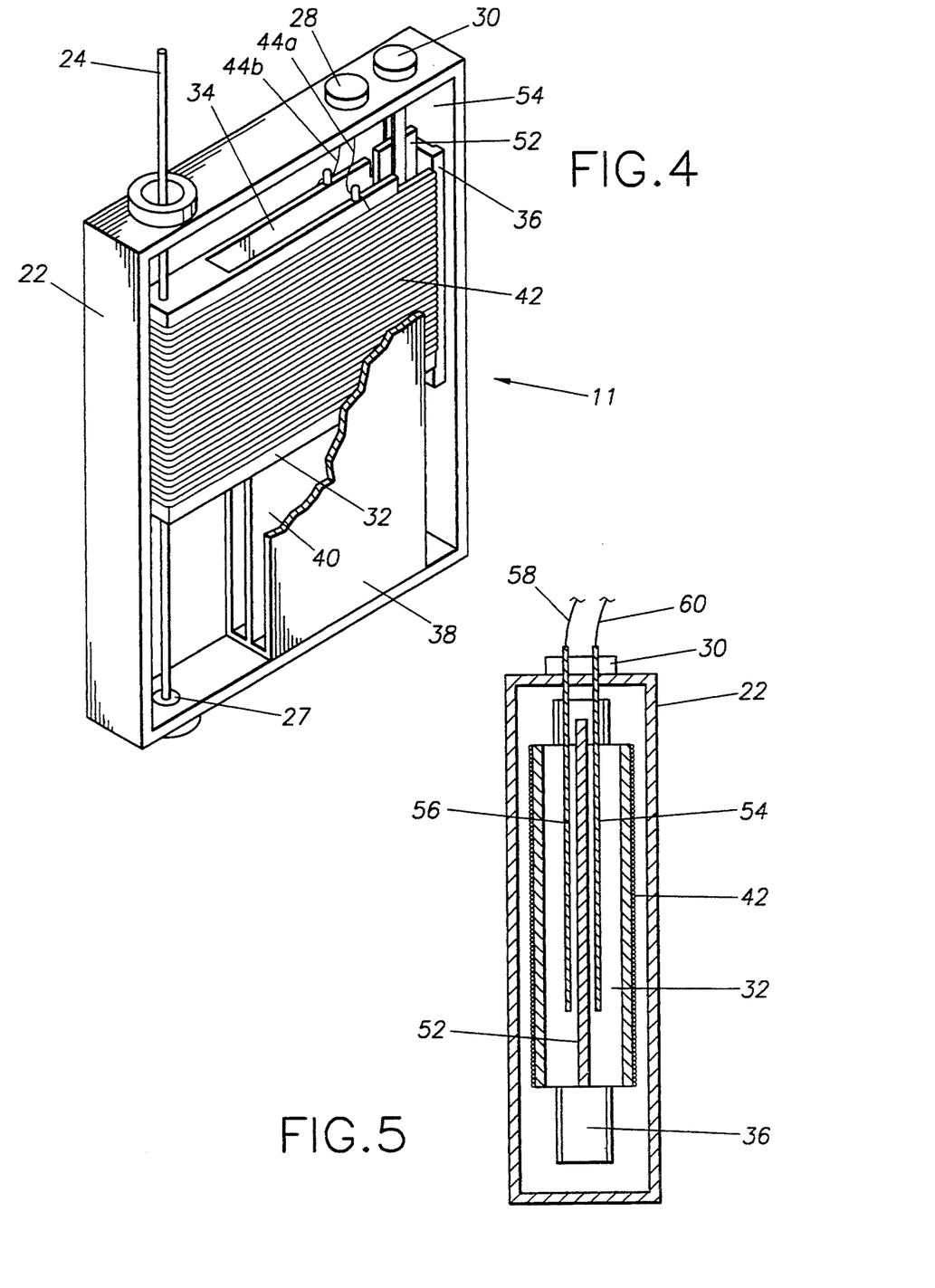
FIG. 4 is a perspective view of an alternate embodiment of the present invention with portions removed and portions broken away for clarity.
FIG. 5 is a cross-sectional view of an embodiment of the device of the present invention as seen along the line 5—5 in FIG. 2.

The details for an alternate embodiment of the device 11 will be appreciated with reference to FIG. 4 wherein it is seen that the device 11 includes a bobbin 32 (similar to coil piston 106) which is formed with a hollow 34. As shown, the bobbin 32 is relatively flat, like housing 22, and is generally box shaped. Further, the bobbin 32 is slidingly attached to a slide mechanism 36 which is itself fixedly attached to the housing 22. Preferably, this mechanism 36 is a very light precision way which creates minimal friction forces during movement of the bobbin 32. The mechanism 36 can be established in any of several ways, all known in the pertinent art, and can be provided with travel stops which will limit the distance through which bobbin 32 can travel along the mechanism 36. Preferably, the extent of this travel is in the range of between two and four inches (2–4 inches). Consequently, the bobbin 32 is able to slide freely along the mechanism 36 and to reciprocate within the housing 22 through this distance. It is also important to recognize that the grip 24 is attached to the bobbin 32 for linear movement with the bobbin 32.

FIG. 4 also shows that a magnet 38 is mounted inside the housing 22. Specifically, the magnet 38 is formed with a projection 40 and is positioned inside the housing 22 so that the projection 40 of magnet 38 extends into the hollow 34 of the bobbin 32. Preferably, the magnet 38 is of a commercially available type which is made of a rare earth element. For example, a Neodenium 35 megagaussoersted magnet is suitable for use in the present invention. Further, it is preferable that the magnet 38 be a permanent magnet which is capable of operating with a magnetic intensity on the order of approximately thirty-five MEG oersted (35 MOe). When the magnet 38 is positioned in housing 22 as shown in FIG. 4, it will be appreciated by the skilled artisan that the poles of magnet 38 can be oriented on the housing 22 to effectively establish a magnetic field having flux lines that are aligned substantially perpendicular to the directions along which the bobbin 32 reciprocates in the housing 22.

The device 11 also includes a coil 42 which is made from an electrical wire 44 that is wound around the bobbin 32. Importantly, the winding of coil 42 around the bobbin 32 should be sufficiently tight to effectively join coil 42 to the bobbin 32. The ends 44a and 44b of the electrical wire 44 are electrically attached to the connector 28 so that an external voltage source 46 (shown in FIG. 7) can be used to energize the coil 42. As will be appreciated by those skilled in the pertinent art, with the coil 42 located in the magnetic field that is generated by the magnet 38, when a current from voltage source 46 is passed through the coil 42 a force is imposed on the bobbin 32 that will move the bobbin 32 within the housing 22. Depending on the amount, the direction, and the duration of the current which is passed through coil 42, the force which is generated on the bobbin 32 can be controlled. Preferably, the magnitude of the forces generated on the bobbin 32 will be in a range from zero to ten thousand grams (0–10000 grams). As intended for the present invention the device 11 (FIGS. 2 and 4) as well as the apparatus 100 (FIG. 3) will likely operate in a range where approximately zero to two thousand grams (0–2,000 gm) variable of force are selectively applied with a deviation of only plus or minus one gram (±1 gm). Further, as is well known in the pertinent art and as indicated above, the position and direction of travel of the bobbin 32 can be controlled by the magnitude and direction of flow of current through the coil 42.

Figures 6, 7:
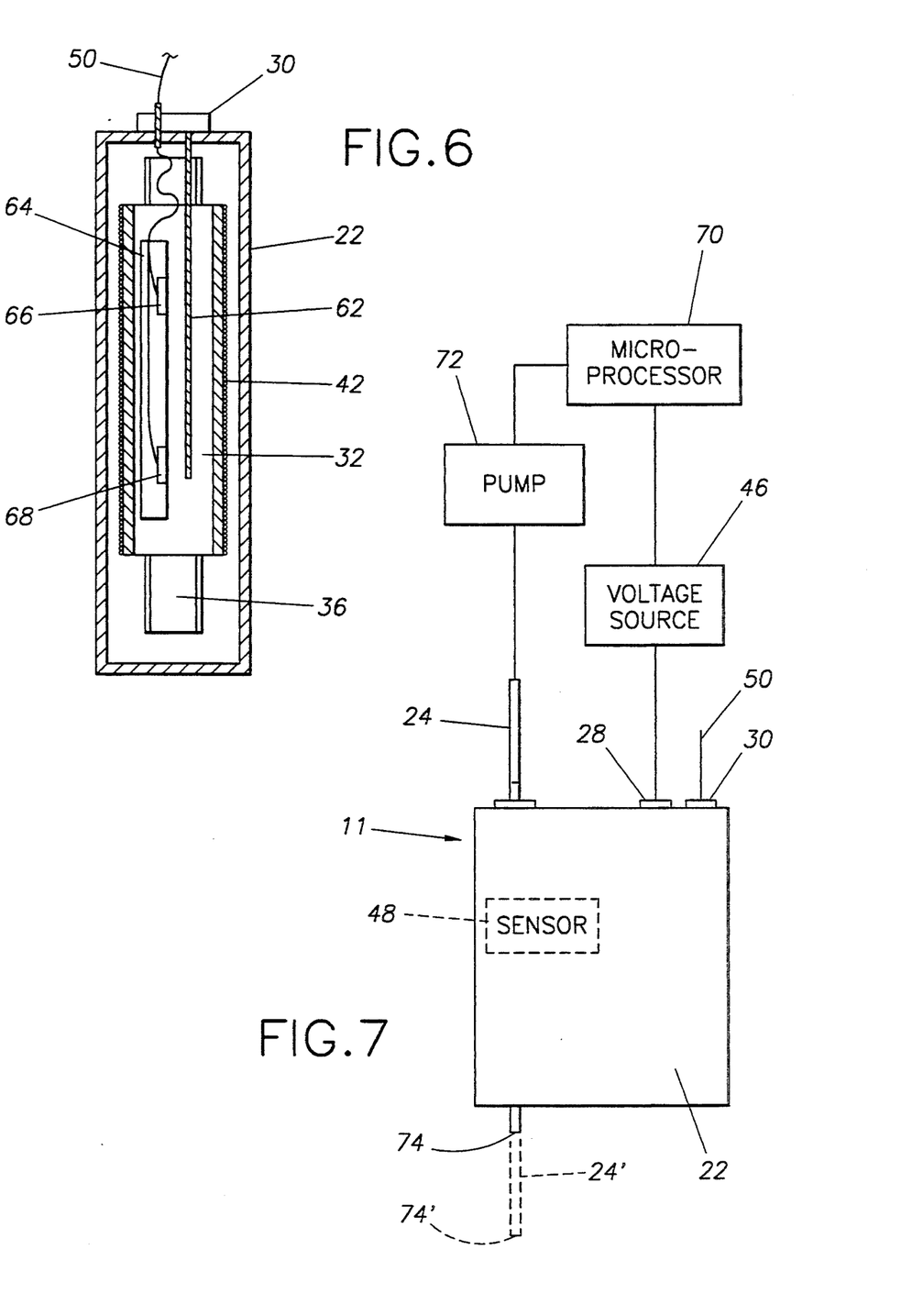
FIG. 6 is a cross-sectional view of an embodiment of the device of the present invention as would be seen along the line 5—5 in FIG. 2.
FIG. 7 is a schematic diagram of the electrical connections between various components of the device of the present invention.

For the operation of the device 11, it is important to be able to determine the positional relationship between the bobbin 32 and the housing 22. To do this, several position sensors can be suggested. Referring for the moment to FIG. 7, it will be seen that a sensor 48 is incorporated into the device 11 and is operatively connected through a line 50 to the sensor connector 30 located on housing 22 of device 11. Further, line 50 completes the connection between sensor connector 30 and microprocessor 70. In one embodiment the position sensing function can be accomplished using a capacitance inductance (LVDT) sensor like the one shown in FIG. 5. There it will be seen that the device 11 can include a middle plate 52 which is fixedly mounted to the bobbin 32 for movement with the bobbin 32 in the housing 22. This middle plate 52 is then disposed between a plate 54 and a plate 56 which are each fixedly connected to the housing 22 of device 11. Further, the plates 54 and 56 are respectively connected to lines 58 and 60 which, together, constitute the line 50 in this embodiment. Consequently, as middle plate 52 moves with the bobbin 32, the electrical capacitance between the plate 54 and 56 will be changed. This change in capacitance can be determined by the sensor 48 by means well known in the art to ascertain the position of the bobbin 32 relative to the housing 22. The flat plates remove concentricity problems and, as they are located away from the coil [a heat source], the sensor will be accurate.

In an alternate embodiment of the sensor 48, the capacitive elements comprising the plates 52, 54 and 56 are removed and, instead, a photo-electric system much like the encoder 122 previously discussed in conjunction with the apparatus 100 is incorporated. Specifically, a scale 62 is fixedly attached to the housing 22 and, as indicated by cross-referencing FIGS. 5 and 6, the scale 62 is generally located in the same position as was the plate 54 in the embodiment previously disclosed for the sensor 48. Additionally, a photoelectric detector 64 is fixedly mounted on the bobbin 32 for movement therewith. The detector 64 can include photodiode elements 66 and 68 which, either individually or collectively, will interact optically with the scale 62, in a manner well known in the pertinent art, to provide information about the position of the bobbin 32 relative to the housing 22.

Figure 9:
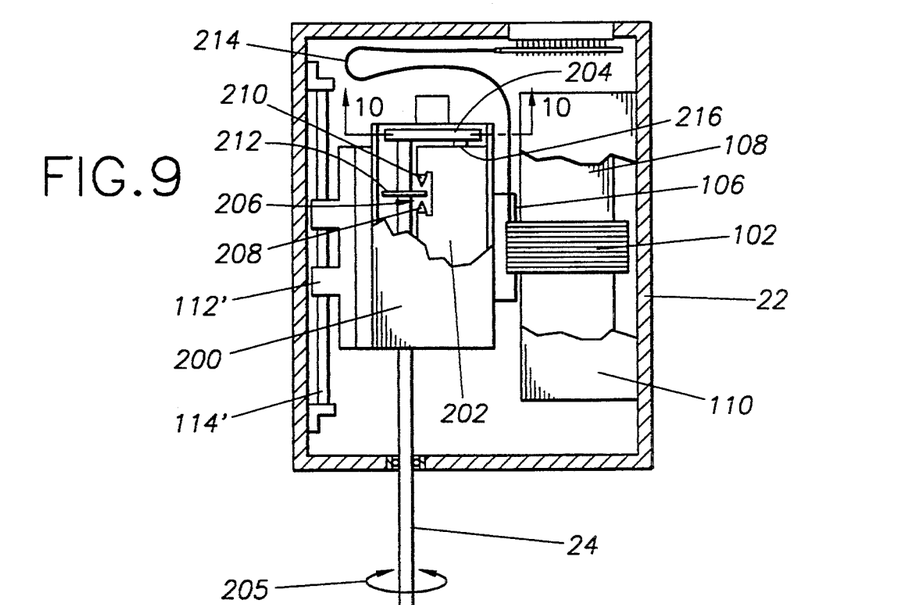
FIG. 9 is a side cross-sectional view of an embodiment of the device of the present invention, similar to the view of FIG. 4, having both translational and rotational actuator controls.

Referring now to FIG. 9, it will be seen that one of the preferred embodiments of the present invention includes components which allow for both translational and rotational control over a work component 14 which is being moved by the rod/grip 24. Specifically, as with other embodiments of the present invention, a magnet 108 is mounted in the housing 22 and a coil 102 is disposed in the magnetic field established by the magnet 108. Also, as before, the coil 102 is fixedly attached to a coil piston 106 so that the coil piston 106 moves with coil 102 under the influences of forces which are generated on the coil in the magnetic field as a current is passed through the coil 102.

FIG. 9 also shows that a casing 200 is attached to the coil piston, and that the casing 200 is slidably attached to housing 22. This attachment between casing 200 and housing 22 is established through the interaction of bearings 112' on casing 200 with bearing rail 114' on housing 22. It is also shown in FIG. 9 that the rod/grip 24 is rotatably mounted on the casing 200 for translational motion with the casing 200 and coil piston 106. Additionally, an electrical servo motor 202, of any type well known in the pertinent art, is mounted in casing 200 for translational movement with coil piston 106.

The electrical servo motor 202 is shown to be connected to the grip/rod 24 by a linkage 204. More specifically, as more fully disclosed below, the linkage 204 is used for the purpose of transferring power from motor 202 into a rotational motion of the grip/rod 24. Specifically, the interest here is in rotation of the grip/rod 24 about its longitudinal axis as indicated by the arrows 205 in FIG. 9. An optical encoder 206 is also mounted in the casing 202 for translational movement with motor 20 and coil piston 106. As shown, optical encoder 206 includes a light source 208 and a light detector 210. Further, FIG. 9 shows that an encoder wheel 212 is fixedly mounted on the grip/rod 24 for rotational movement with the grip/rod 24. Consequently, movement of the encoder wheel 212 due to rotation of the grip/rod 24 can be detected by interruption of the light beam passing between light source 208 and light detector 210. These interruptions can then be sent as signals via control cable 214 to microprocessor 70 for purposes to be more fully discussed below. It is to be appreciated, that the particular optical encoder 206 and encoder wheel 212, and their operative interaction, can be duplicated by other means well known in the pertinent art.

Figure 10A:
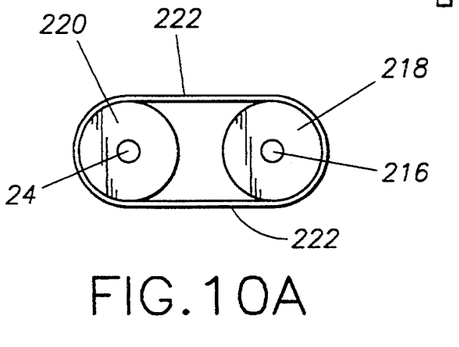
FIGS. 10A, 10B and 10C are views of different embodiments for the rotational linkage of the device of the present invention as generally seen along the line 10—10 in FIG. 9.
Figure 10B:
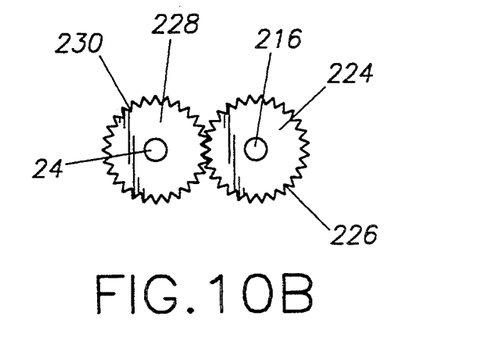
Figure 10C:
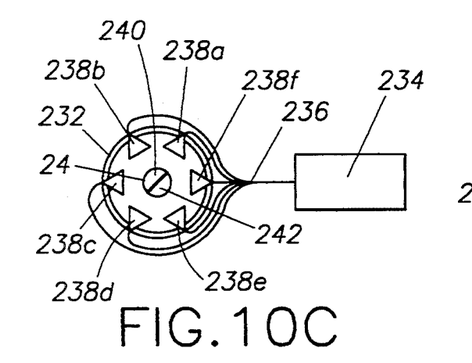

The linkage 214 can have several configurations. More specifically, FIGS. 10A, 10B and 10C show three possible configurations for linkage 214. In FIG. 10A, a belt drive mechanism is shown. For this particular configuration of linkage 214, the drive shaft 216 of servo motor 202 has a pulley 218 attached to it. Similarly, a pulley 220 is attached to grip/rod 24 and a belt 222 passes around the edges of the pulleys 220 and 222. Consequently, rotation of the drive shaft 216 by servo motor 202 is transmitted via pulley 218 and through belt 222 to pulley 220 for rotation of grip/rod 24.

FIG. 10B shows another embodiment for the linkage 214 wherein a gear 224 having a plurality of teeth 226 on its peripheral edge is attached to the drive shaft 216 of servo motor 202. Also, for this embodiment a gear 228 having a plurality of teeth 230 on its peripheral edge is attached to grip/rod 24. As shown, the teeth 226 of gear 224 mesh with teeth 230 of gear 228 so that rotation of drive shaft 216 by servo motor 202 is translated into a rotational movement of grip/rod 24. As between the embodiment of linkage 214 shown in FIG. 10A and the embodiment shown in FIG. 10B, the gears 224, 226 of the FIG. 10B embodiment are more likely to resist slippage. On the other hand, the embodiment for a linkage 214 shown in FIG. 10C allows for rotation of the grip/rod 24 without requiring physical contact with the grip/rod 24 and, thus, avoids mechanical backlash.

For the embodiment of linkage 214 shown in FIG. 10C, grip/rod 24 is surrounded by a stator 232 and the servo electric drive motor 202 is replaced with an electronic drive 234. Also, a wiring harness 236 is used to electrically connect electronic drive 234 which each of the electrical coil magnets 238a-f which are mounted in stator 232. Electronic drive 234 will drive current through the electrical coil magnets 238a-f in a predetermined sequence to alternately change the polarization of the coil magnets 238a–f. More specifically, while electrical coil magnets 238a,c,e are established with a North (N) polarization, the electrical coil magnets 238b,d,f will be established with a South (S) polarization. The reverse is also true. If magnets 238a,c,e have a South polarization, then magnets 238b,d,f will have a North polarization. As will be appreciated by the skilled artisan, the polarization and the strength of the polarization of each magnet 238a–f can be controlled by current from electronic drive 234.

In order for the embodiment of the linkage 214 shown in FIG. 10C to function, the portion of grip/rod 24 which is surrounded by stator 232 must also be magnetized. For example, as shown in FIG. 10C, the grip/rod 24 is magnetized with one side 240 being a North (N) pole and the other side 242 being a South (S) pole. Consequently, the magnetized grip/rod 24 will react to changes in the magnetic polarity of the magnets 238a–f to cause the grip/rod 24 to rotate. Of course, while there is no change in current flow through the magnets 238a–f, and thus no change in polarity of the magnets 238a–f, grip/rod 24 will remain rotationally stationary.

Figure 10D:
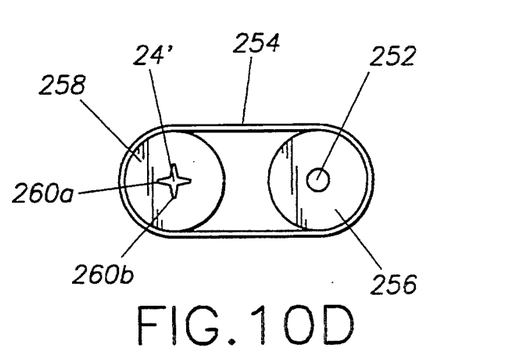
FIG. 10D is a view of the rotational linkage of an alternate embodiment of the device of the present invention as generally seen along the line 10D—10D in FIG. 11.
Figures 11, 12:
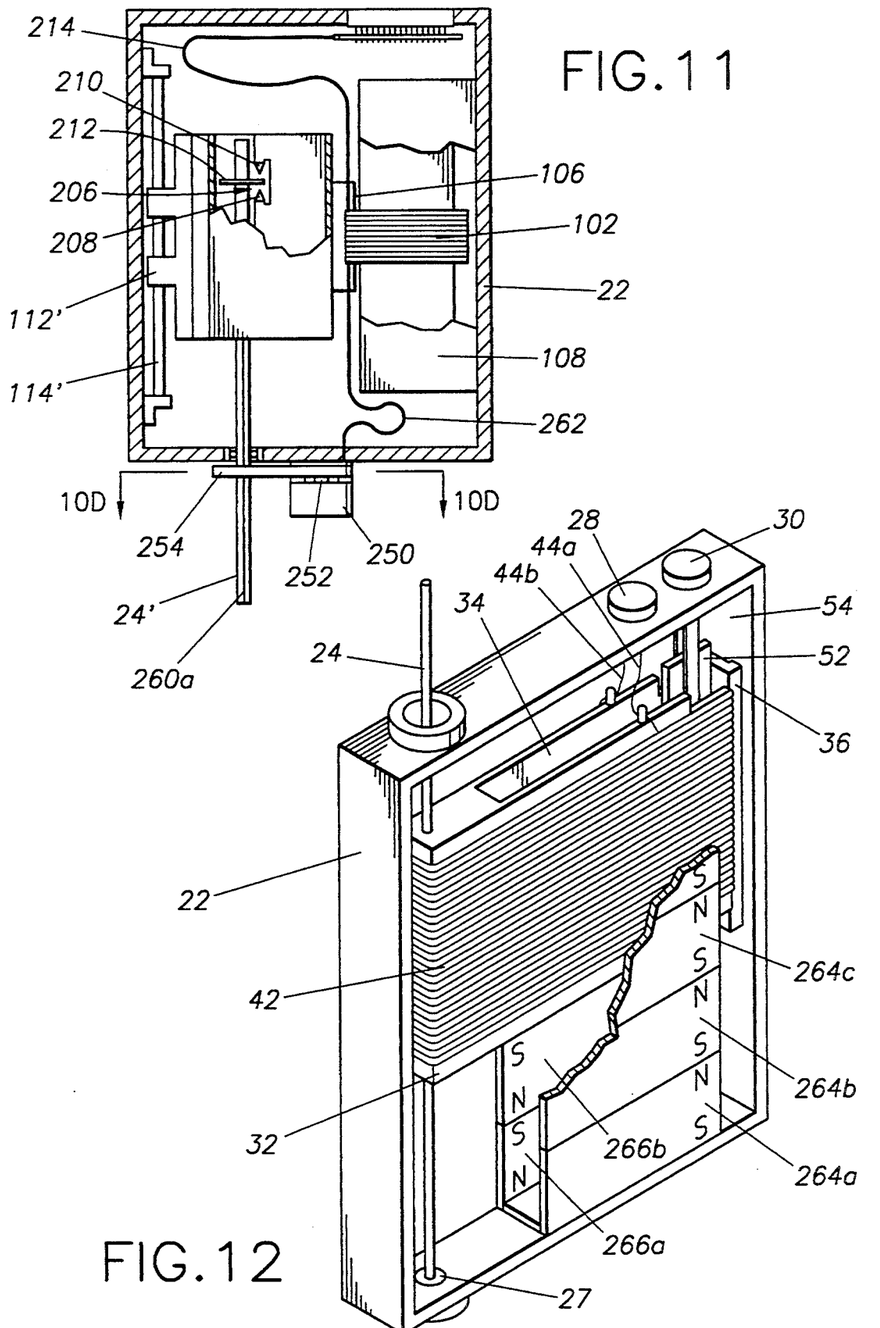
FIG. 11 is a side cross-sectional view of an embodiment of the device of the present invention, similar to the view of FIG. 9, with the drive motor mounted directly on the housing.
FIG. 12 is a perspective cross-sectional view of an embodiment of the device of the present invention wherein the piston coil reciprocates within the magnetic field created by a plurality of magnets which are mounted on the housing to surround the piston coil.

For an alternate embodiment of the device 11 or 100, the drive motor for rotating the grip/rod 24 is mounted directly on the housing 22. This drive motor 250 and a drive shaft 252 which extends from the drive motor 250 are shown in FIG. 11. For the particular embodiment shown in FIG. 11, and as perhaps best appreciated with cross reference to FIG. 10D, a belt 254 is used to connect a pulley 256 which is mounted on the drive shaft 252 with a pulley 258 which is also rotationally mounted on the housing 22. FIGS. 11 and 10D both show that the grip/rod 24' for this embodiment includes a plurality of splines 260, of which the splines 260a and 260b are merely exemplary. In a manner well known in the pertinent art, the splines 260 interact with the pulley 258 to allow the grip/rod 24' to slide through the pulley 258 while also requiring the grip/rod 24' to rotate with the pulley 258. A cable 262 is electrically connected to the central cable 214 to provide electrical power for the operation of drive motor 250. In all important respects the operation of drive motor 250 is the same as the operation of drive motor 202. Further the operation of the optical encoder 206 remains the same regardless of the location of the drive motor 202/250.

Although the linkage between drive motor 250 and grip/rod 24' has so far focussed on the structure shown in FIG. 10D, it is to be appreciated that a linkage such as shown in FIG. 10B using toothed gears can also be incorporated. Similarly, the structure shown in FIG. 10C can be used together with an externally mounted drive motor 250.

FIG. 12 shows an alternate arrangement for the cooperation between the magnets and coil of the device 11/100. For this embodiment a plurality of magnetic segments 264 and 266 are mounted on the housing 22 with the coil 42 positioned between the segments 264 and 266. More specifically, as shown in FIG. 12 a series of magnetic segments 264a, 264b and 264c can be stacked with their respective North (N) and South (S) poles located as shown to establish a magnet having a strength which can be varied according to the number of magnetic segments 264 used. Here the magnetic segments 264a, b and c are only exemplary. Likewise, a series of magnetic segments 266, of which the magnetic segments 266a and b are exemplary, can be stacked as shown to help in the creation of a magnetic field. When the magnetic segments 264 and 266 are arranged as shown in FIG. 12, it will be appreciated that the coil 42 is effectively surrounded by magnets and that, contrary to the embodiment disclosed above for the device 11, the coil 42 is mounted on the housing 22 for reciprocal movement between the magnet segments 264 and 266, rather than having the coil 42 reciprocate over a projection of the magnet.

Figure 13:
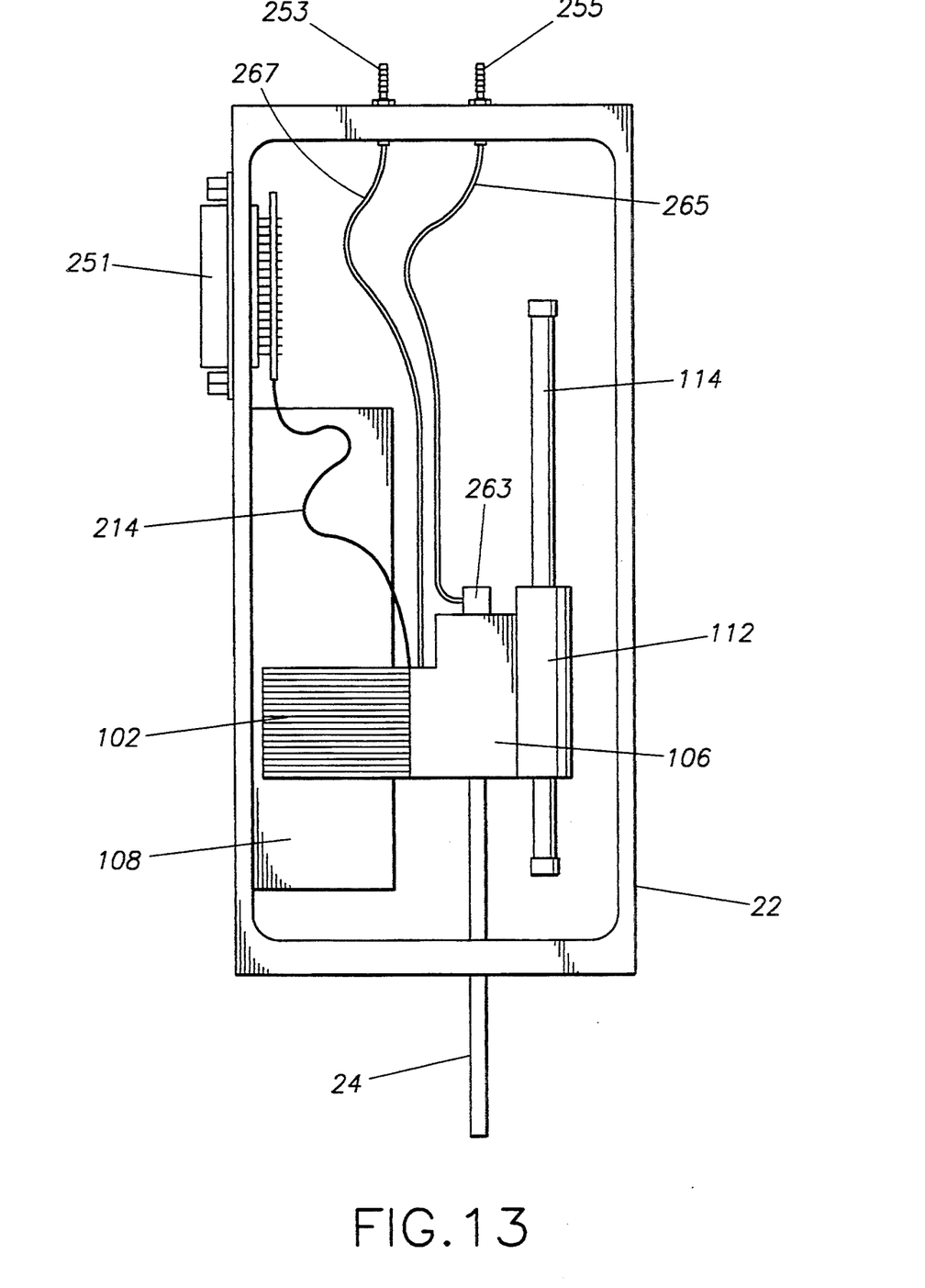
FIG. 13 is an elevation view of the preferred embodiment of the present invention, with the housing cover removed.

FIG. 13 illustrates an embodiment of the present invention which is suitable for use in a situation where rotation of the component 14 is desired, but where the required degree of precision in the rotational mode of motion is relatively low, and where only defined rotational step sizes are required. FIG. 13 also shows an embodiment of the vacuum gripping means which can facilitate precise handling of fragile components. While the vacuum gripping means is shown in conjunction with the pneumatic rotational means, the vacuum gripping system could obviously be used with other embodiments of the invention. The housing 22 is shown, with the magnet 108 and the bearing rail 114 mounted inside. An electrical connector 251, a vacuum fitting 253, and a pneumatic fitting 255 are also shown mounted through the wall of the housing 22. As described before, the linear bearing 112 is slidingly mounted on the bearing rail 114, and the coil piston 106 is fixedly mounted on the linear bearing 112. The linear bearing 112 is precisely constrained to move along the axis of the bearing rail 114. Therefore, the linear translation of the coil piston 106 is also precisely constrained. The grip 24 is also mounted for precise translational movement with the coil piston 106, and the grip 24 is rotatably mounted on the coil piston 106.

Figure 14:
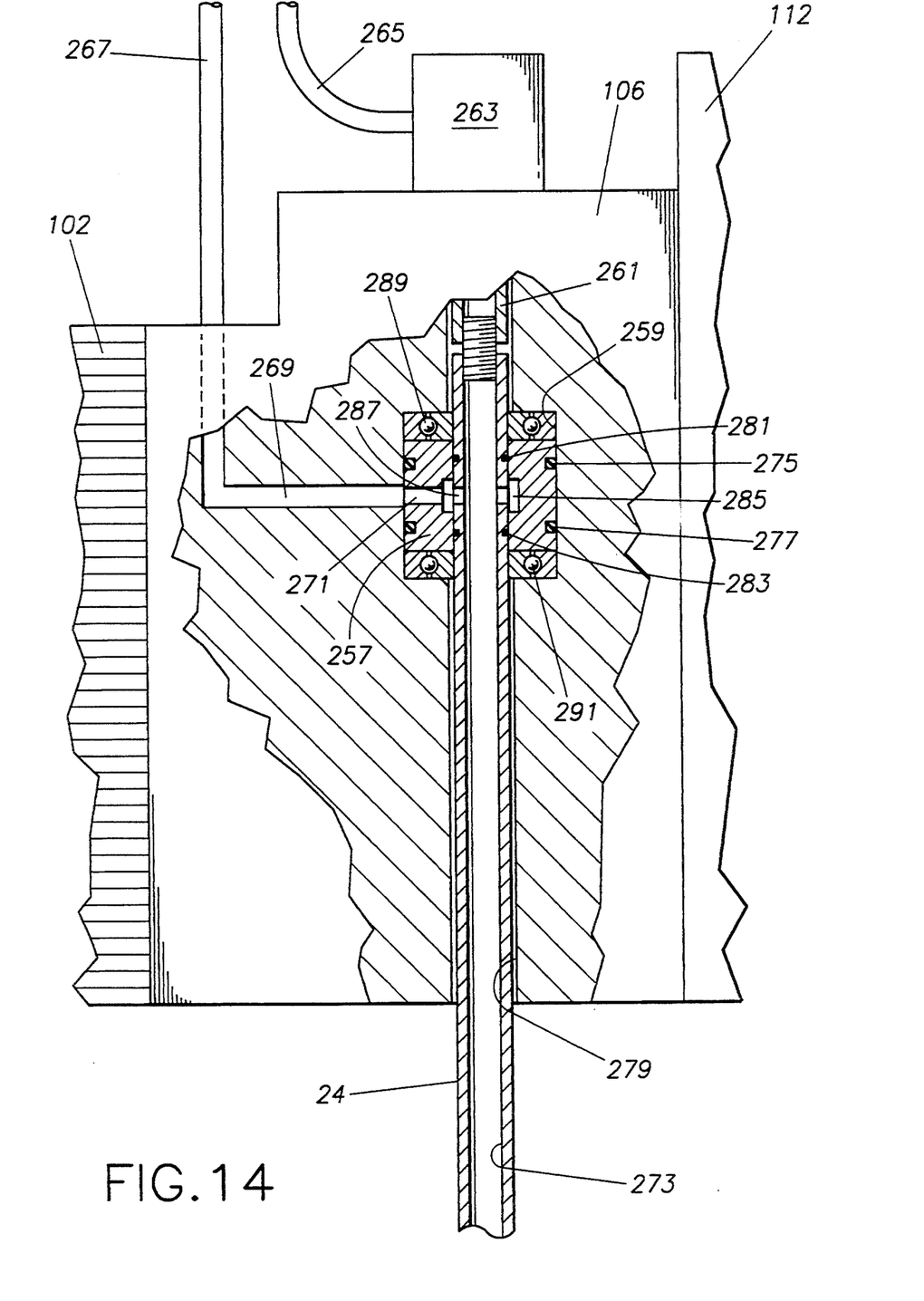
FIG. 14 is a partial section view of the embodiment shown in FIG. 13.

FIG. 14 shows a more detailed view of the functional features of the coil piston 106. The grip 24 is rotatably mounted within a guide passageway 279 within the coil piston 106, while being constrained against translational movement relative to the coil piston 106. The guide passageway 279 and upper and lower bearings 289, 291 precisely constrain the grip 24 to rotate along a given axis. A cylindrical sleeve 257 is rotatably mounted on the outer surface of the grip 24 near the upper end of the grip 24. The cylindrical sleeve 257 fits fixedly within a cylindrical cavity 259 within the coil piston 106, near the upper end of the guide passageway 279. The cylindrical cavity 259 constrains the cylindrical sleeve 257 against axial or rotational movement. A drive coupling 261 is drivably attached to the upper end of the grip 24 and to a pneumatic rotary actuator 263 mounted on the coil piston 106. The rotary actuator 263 can be any such appropriately sized actuator known in the art. The rotary actuator 263 can be designed to rotate in increments of 90° or 180° or some other increment, as required for the particular application, in response to applications of pressurized gas. Pressurized gas is supplied to the rotary actuator 263 through a pneumatic tube 265, which is fed by the pneumatic fitting 255. The gas supply (not shown) to the pneumatic fitting 255 can be controlled manually or by a microprocessor 70.

A vacuum pump 72 can be connected to the vacuum fitting 253 and thence to a vacuum tube 267, which is ultimately connected to the coil piston 106. Specifically, the vacuum tube 267 is connected to a vacuum passageway 269 within the body of the coil piston 106. The vacuum passageway 269 leads to the cylindrical cavity 259 where the cylindrical sleeve 257 is fixedly mounted. An upper sleeve O-ring 275 seated in an annular groove around the upper end of the cylindrical sleeve 257 and a lower sleeve O-ring 277 seated in an annular groove around the lower end of the cylindrical sleeve 257 seal the upper and lower ends, respectively, of the cylindrical cavity 259 against vacuum leakage. Upper and lower rod O-rings 281, 283 are seated in annular grooves on the outer surface of grip rod 24, against the sleeve 257, to seal against vacuum leakage between the sleeve 257 and the grip rod 24 as the grip rod 24 rotates. The O-rings 275, 277, 281, 283 can be made of an elastomer or another suitable material. Sealing of the grip rod 24 and the sleeve 257 in this fashion, with the O-rings 275, 277, 281, 283, allows leak-free rotation of the grip rod 24, precisely constrained by the bearings 289, 291 to provide an economical yet reliable mechanism for precisely positioning the component 14. A vacuum port 271 leads from the outer surface of the cylindrical sleeve 257 to the inner bore 273 of the grip 24, via an annular vacuum channel 285 in the inner surface of the sleeve 257 and via a port 287 in the grip rod 24. The vacuum applied to the vacuum fitting 253 and thence to the inner bore 273 of the grip 24 can be controlled manually or by a microprocessor 70 to pick up or release the component 14.

OPERATION

Figure 8:
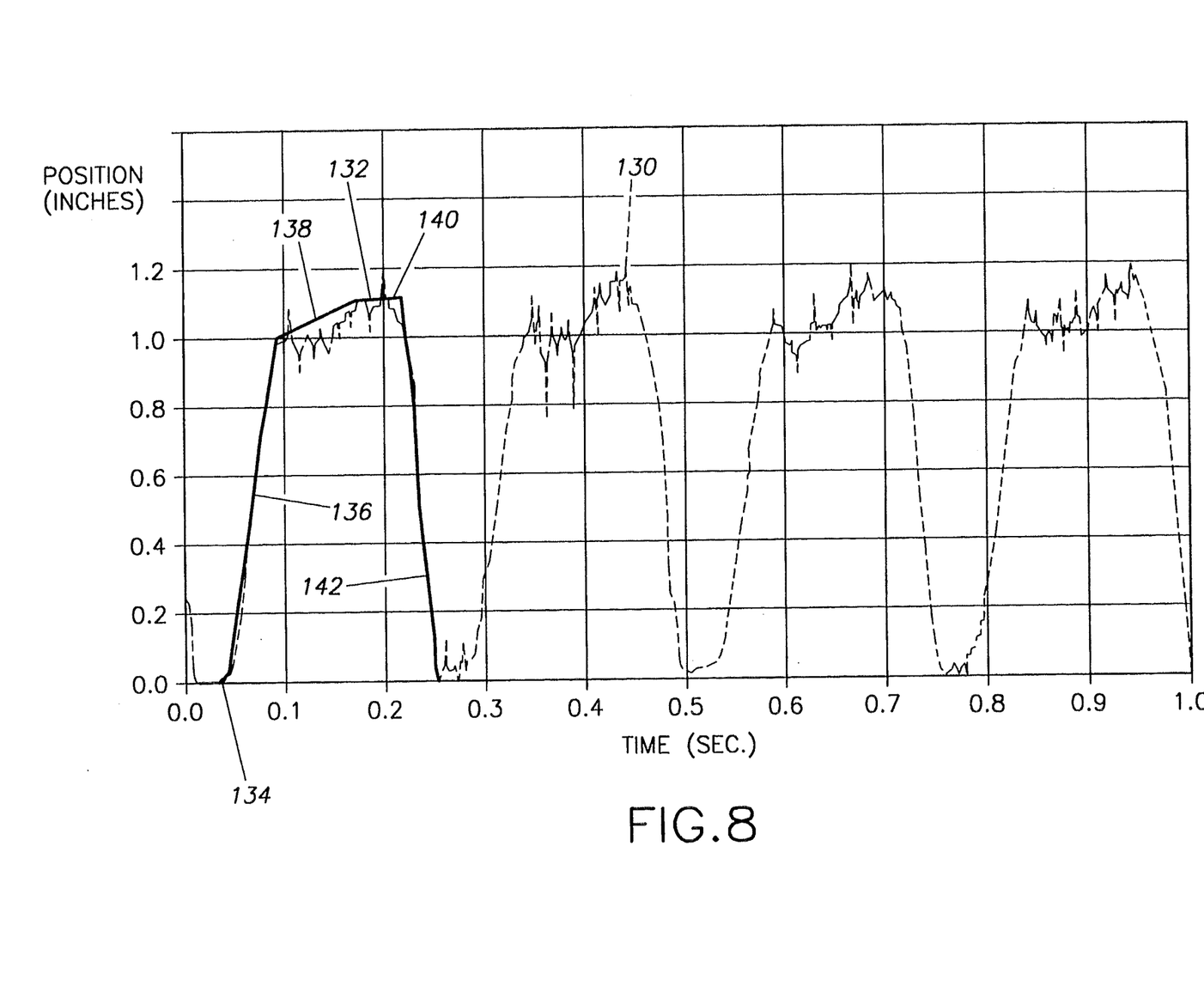
FIG. 8 is a graph showing the relationship of position and time for the grip operations of the actuator.

The general operation of the device 11 or 100 will, perhaps, be best understood by reference to FIG. 7 and FIG. 8. In FIG. 7 it will be seen that a microprocessor 70, of any type well known in the pertinent art, is connected to both the voltage source 46 and the sensor 48. Additionally, microprocessor 70 is connected to a vacuum pump 72 which can, in turn, be operatively connected with the grip 24. Finally, the microprocessor 70 can be connected to a compressor or other compressed gas source, which is connected to the pneumatic rotary actuator 263. Through these connections, the microprocessor 70 will interact with the voltage source 46, the sensor 48, the compressor, and the pump 72 in accordance with preprogrammed instructions. Although references here may be directed to the embodiment of the device 11 shown in FIGS. 2 and 4, it is to be understood that corresponding components of the apparatus 100 operate in substantially the same manner. Their operation is considered to be equivalent.

Initially, the device 11 (apparatus 100) can be incorporated into the automated assembly machine 12 and calibrated to locate the end 74 of grip 24 at a preselected distance from the conveyor 16. This establishes a reference datum for the cycle from which movement of the grip can be measured. Actually, as will be appreciated by the skilled artisan, any other appropriate reference may be used for this purpose. Regardless what reference is used, once a reference datum from which measurements can be made has been selected, the sensor 48 can be set for this datum. In accordance with preprogrammed instructions, the microprocessor 70 then activates the voltage source 46 to send an electrical current through the coil 42. Because the coil 42 is in the magnetic field of the magnet 38, the current which passes through the coil 42 causes bobbin 32 (or coil piston 106 for apparatus 100) to move a distance which is proportionately determined and controlled by the amount, duration and direction of the current. It is known, for example, that with this disclosed arrangement, the grip 24 can be linearly moved through a distance of approximately two inches (2 in.) in around seventy milliseconds (70 ms) with effectively no bounce at the end of the stroke. Stated differently, movements of this nature can be made without noticeable changes in the direction of linear movement at the conclusion of the movement.

Rotational movement of grip/rod 24 is also controlled by microprocessor 70. Specifically, microprocessor 70 can be preprogrammed to initiate rotation of product component 18 as desired by the operator. For instance, in some operations it is necessary to align the product component 14 both linearly and angularly before it is positioned or engaged with another component of the product being manufactured. Therefore, in addition to the linear alignment of the work component 14 discussed above, device 11 must sometimes be capable of rotating the component 14 into a proper alignment. To do this, signals from optical encoder 206 which are indicative of the angular position of wheel 212 and work component 14 are sent to microprocessor 70. Any difference between the actual angular orientation and a desired angular orientation is then corrected by signals from microprocessor 70 to servo motor 202 which accordingly rotates grip/rod 24 to move work component 18 into a proper alignment. Similarly, in cases where it is necessary to rotate the product component 18 in order to screw or thread the component 14 into place, microprocessor 70 can activate servo motor 202 (or electronic drive 234) to rotate the component 14 as necessary. Further, it will be appreciated by the skilled artisan that grip/rod 24 can be either rotated through a desired angular rotation, or the grip/rod 24 can be rotated until there is a preselected torque resistance to further rotation. Alternatively, the microprocessor 70 can control the pressurized gas supply to the rotary actuator 263 to rotate the grip 24 by 90° or 180° or by some other angular increment, depending upon the particular actuator 263 installed.

The microprocessor 70 can also be used to control the operation of a vacuum pump 72. This may be helpful for an embodiment of the device 11 which uses the creation of a partial vacuum in the lumen of the tubular grip 24 to hold a component 14 against the end 74 of the grip 24. It is to be recognized that other gripping arrangements may also be used, and that the vacuum gripping arrangements can be used with other embodiments. The partial vacuum system disclosed herein is only exemplary.

As intended for a representative cycle in the operation of the present invention, the device 11 is initially positioned as shown in FIG. 1 with the grip 24 positioned over a component 14 which is being taken into position for retrieval by the conveyor 16. Voltage source 46 is then activated in accordance with a preprogrammed sequence from microprocessor 70 to lower the end 74 of grip 24 into a position indicated for end 74'. In accordance with previous disclosure, this movement is accomplished by passing a predetermined current through the coil 42. Pump 72 is then activated to generate a partial vacuum within the lumen of grip 24 to suck and hold the component 14 against the end 74. ,Grip 24, with component 14 attached, is then withdrawn into the housing 22, by the activation of coil 42, and the device 11' is positioned over conveyor 20. Again, coil 42 is activated by the voltage source 46 to precisely lower component 14 to a desired stop point and into position on the component 18. This placement can be accomplished with great precision. For example, tolerances on the order of one one-hundredth of a millimeter (0.01 mm) have been accomplished using the device 11 of the present invention. Importantly, sensor 48 can be used to monitor this placement and thereby provide a real-time verification of proper assembly.

In a similar manner, the angular rotation of the component 14 can be checked. In a manner similar to the linear positioning of the component 14, the optical encoder 206 is useful for ensuring proper angular positioning of the component 14. As indicated above, microprocessor 70 is electrically connected to optical encoder 206 and, based upon signals received by microprocessor 70 from the optical encoder 206, errors in angular alignment can be corrected. This is done in a conventional manner by determining any error signals which are generated because of a difference between the actual and the desired angular orientation of the work component 14.

Once component 14 has been properly positioned on the component 18, microprocessor 70 can be used to control the pump 72 to relieve the vacuum created in the grip 24 to release the component 14 from the grip 24. Again, the grip 24 is withdrawn into the housing 22 and the device 11 is repositioned over the conveyor 16 for another cycle of operation.

An actual time history response for the position of rod 24 during a series of cycles is shown in FIG. 8 and is designated 130. The response 130 is, in fact, only exemplary. Indeed, rod 24 may be moved through greater or lesser distances and the time for each cycle may be varied. Nevertheless, response 130 is considered typical for the apparatus 100 and is used here for discussion purposes. For the specific case illustrated in FIG. 8, the response 130 is shown over a one second period of time and indicates that the apparatus 100 has moved rod 24 through four complete cycles during this one second interval. Further, FIG. 8 shows that rod 24 was reciprocally moved through a distance of approximately one and one tenth inches (1.1 in) in each cycle. As indicated above, the position of rod 24 at any time during the cycle can be determined by encoder 122 to an accuracy within five thousandths of a millimeter (0.005 mm). Consequently, the completion of a cycle within a preprogrammed dimensional envelope can be used to indicate whether the work has been successfully completed. Additionally, with this control, and in view of the extremely small masses which are moved during the operation of apparatus 100, the forces which are generated on a workpiece as it is being handled by apparatus 100 will be very light. Tests have indicated that forces as small as five grams (5 gm) can be generated with apparatus 100 and that forces of this small magnitude can be generated with an accuracy of plus or minus one gram (±1 gm).

For a more complete appreciation of the operational aspects of the apparatus 100, consider the idealized curve 132 which has been superimposed over the first cycle of the response 130. The curve 132 for this cycle begins at time zero with the rod 24 in its withdrawn position and ends approximately one quarter second later (0.25 sec) when the rod 24 has returned to its withdrawn position. A discussion of this cyclic operation is appropriately discussed by considering individual time intervals within a particular cycle.

The beginning of the cycle is indicated in FIG. 8 by the top dead center portion 134 of curve 132. In practice, top dead center portion 134 corresponds to the position 74 shown in FIG. 7 and, as shown, rod 24 stays in this position during approximately the 0.00-0.04 seconds interval of the cycle. A positioning stroke 136 for curve 132, which immediately follows top dead center portion 134, indicates that rod 24 is quickly moved through a distance of approximately one inch during the cycle interval from 0.04-0.09 seconds. This rapid movement of the rod 24 is possible due to the relatively small mass of the components in apparatus 100 which must move with the rod 24. A deceleration period during the interval 0.09-0.17 seconds of the cycle is provided to steadily move the rod 24 into proper position with precision and minimal inertial forces.

Once contact has been established between the workpiece being carried by rod 24, and the substrate onto which the workpiece is being placed, there is an interval between approximately 0.17-0.21 seconds in the cycle wherein force is applied to attach or position the workpiece on the substrate. This interval is indicated as the force application period 140 in FIG. 8. During period 140, the successful completion of the work can be verified by monitoring signals from encoder 122. Specifically, by comparing signals from encoder 122, which indicate the actual position of the rod 24 at this point in the work cycle, with a reference for the programmed position for rod 24 at this point during a successful work cycle, operational deviations can be determined. If this comparison indicates only minor deviations in the position of rod 24, and these deviations are within acceptable tolerances, the work cycle can be considered successful.

After the force application period 140, the rod 24 is withdrawn back to a top dead center position during an interval in the cycle during approximately 0.21-0.25 seconds. The cycle is then repeated as necessary and the same intervals are used. As indicated above, the cycle discussed here in relation to the idealized curve 132 is only exemplary. The parameters which establish the operational envelope for apparatus 100 and device 11 can be varied according to the desires of the operator.

While the particular device for moving and positioning an assembly component in an automated assembly operation as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

We claim:

1. A device for moving and positioning an assembly component in an automated assembly operation which comprises:

a housing;

means mounted on said housing for creating a magnetic field;

an electrical coil slidably mounted on said housing for carrying a current, said coil being disposed for translational movement within said magnetic field in response to current flow through said coil;

a grip rotatably mounted for translational movement with said coil, said grip being engageable with said component;

a pneumatic rotary actuator mounted for translational movement with said coil;

a coupling for connecting said rotary actuator to said grip;

means electrically connected with said coil for providing said electrical current to move said coil in translation; and means pneumatically connected with said rotary actuator for activating said rotary actuator to rotate said grip.

2. A device as recited in claim 1, further comprising:
means for sensing the translational position of said grip; and
means for sensing the rotational position of said grip.

3. A device as recited in claim 1, wherein said means for creating a magnetic field comprises a magnet mounted on said housing.

4. A device as recited in claim 3, wherein said magnet comprises a plurality of magnet segments, said magnet segments being disposed in a surrounding relationship to said coil.

5. A device as recited in claim 3, further comprising a coil piston, and wherein said coil is wrapped around said coil piston and said coil is slidingly disposed around said magnet.

6. A device as recited in claim 5, wherein said rotary actuator is mounted on said coil piston for translational movement therewith.

7. A device for transporting and positioning a workpiece which comprises:
a housing;
a rare earth magnet mounted on said housing for creating a magnetic field, said magnet having a projection;
a bobbin slidingly mounted on said housing, said bobbin being disposed around said projection;
a grip for holding said workpiece, said grip being rotatably attached to said bobbin for translational movement therewith;
a coil for generating an electrical current in said magnetic field, said coil being wrapped around and connected to said bobbin to move said bobbin in translation in response to a generated electrical current;
a pneumatic rotary actuator mounted on said bobbin, said rotary actuator being engageable with said grip for rotating said grip;
a source of electrical current, said source being electrically connected with said coil; and
a source of compressed gas connected with said rotary actuator for pneumatically activating said rotary actuator to rotate said grip.

8. A device as recited in claim 7, wherein said grip comprises:
a rod rotatably attached to said bobbin; and
means attached to said rod for gripping said workpiece.

9. A device as recited in claim 7, further comprising a coupling for engaging said rotary actuator with said grip.

10. A device as recited in claim 7, wherein said magnet comprises a plurality of magnet segments, said magnet segments being disposed in a surrounding relationship to said coil.

11. A method for inspecting and positioning an assembly component in an automated assembly operation, the method comprising the steps of:
providing a device having a permanent magnet creating a magnetic field, an electrical coil for carrying a current, said coil being disposed for translational movement within said magnetic field in response to current flow through said coil, a grip connected with said coil and engageable with said component, and a pneumatic rotary actuator mounted on said device, said rotary actuator being engageable with said grip for rotation thereof;
providing a means for determining the difference in translation between an actual position of said grip and a desired position to generate a first error signal and cause an electrical current to flow through said coil for translational movement of said coil when said first error signal has an absolute value greater than zero;
providing a means for determining the difference in rotation between an actual position of said grip and a desired position to generate a second error signal and activate said rotary actuator to rotate said grip when said second error signal has an absolute value greater than zero.

12. A device for moving and positioning an assembly component in an automated assembly operation which comprises:
a housing;
means mounted on said housing for creating a magnetic field;
an electrical coil slidably mounted on said housing for carrying a current, said coil being disposed for translational movement within said magnetic field in response to current flow through said coil;
a hollow tubular grip rotatably mounted to said coil, for translational movement with said coil;
a vacuum means rotatably connected to said grip for selectively applying a vacuum through said grip to engage said component with said grip;
a rotary means connected to said grip for selective rotation of said grip relative to said coil; and
means electrically connected with said coil for providing said electrical current to move said coil in translation.

13. A device for moving and positioning an assembly component in an automated assembly operation, as claimed in claim 12, further comprising:
a piston fixedly mounted to said coil, whereby said grip is indirectly mounted to said coil by means of being rotatably mounted to said piston;
a bearing means for precisely controlling the axis of rotation of said grip relative to said piston; and
a sealing means for sealing against vacuum leaks between said rotatably mounted grip and said piston.

14. A device for moving and positioning an assembly component in an automated assembly operation, as claimed in claim 13, wherein said sealing means comprises:
a sleeve fixedly mounted to said piston, whereby said grip is indirectly mounted to said piston by means of being rotatably mounted to said sleeve;
a first vacuum port through said sleeve for applying said vacuum to said grip;
an annular vacuum channel on an inside diameter of said sleeve, said vacuum channel being aligned with said first vacuum port for applying said vacuum to the circumference of said grip;
a second vacuum port through said grip, said second vacuum port being aligned with said vacuum channel for applying said vacuum to the interior of said grip;
a first O-ring positioned between said sleeve and said piston for sealing against vacuum leaks between said sleeve and said piston; and
a second O-ring positioned between said grip and said sleeve for sealing against vacuum leaks between said rotatably mounted grip and said sleeve.

15. A device for moving and positioning an assembly component in an automated assembly operation, as claimed in claim 14, wherein:
said first O-ring is mounted in a first annular groove on an outside diameter of said sleeve; and
said second O-ring is mounted in a second annular groove on an outside diameter of said grip.

16. A device for moving and positioning an assembly component in an automated assembly operation, as claimed in claim 14, further comprising:
a third O-ring positioned between said sleeve and said piston for sealing against vacuum leaks between said sleeve and said piston, said first vacuum port being positioned between said first O-ring and said third O-ring; and
a fourth O-ring positioned between said grip and said sleeve for sealing against vacuum leaks between said rotatably mounted grip and said sleeve, said second vacuum port being positioned between said second O-ring and said fourth O-ring.

17. A device for moving and positioning an assembly component in an automated assembly operation which comprises:
a housing;
means mounted on said housing for creating a magnetic field;
an electrical coil slidably mounted on said housing for carrying a current, said coil being disposed for translational movement within said magnetic field in response to current flow through said coil;
a hollow tubular grip rotatably mounted to said coil for translational movement with said coil;
a vacuum means rotatably connected to said grip for selectively applying a vacuum through said grip to engage said component with said grip;
a pneumatic rotary actuator mounted to said coil for translational movement with said coil;
a coupling for connecting said rotary actuator to said grip;
means electrically connected with said coil for providing said electrical current to move said coil in translation; and
means pneumatically connected with said rotary actuator for activating said rotary actuator to rotate said grip.

18. A device for moving and positioning an assembly component in an automated assembly operation, as claimed in claim 17, further comprising:
a piston fixedly mounted to said coil, whereby said grip and said rotary actuator are indirectly mounted to said coil by means of being mounted to said piston;
a bearing means for precisely controlling the axis of rotation of said grip relative to said piston; and
a sealing means for sealing against vacuum leaks between said rotatably mounted grip and said piston.

19. A device for moving and positioning an assembly component in an automated assembly operation, as claimed in claim 18, wherein said sealing means comprises:
a sleeve fixedly mounted to said piston, whereby said grip is indirectly mounted to said piston by means of being rotatably mounted to said sleeve;
a first vacuum port through said sleeve for applying said vacuum to said grip;
an annular vacuum channel on an inside diameter of said sleeve, said vacuum channel being aligned with said first vacuum port for applying said vacuum to the circumference of said grip;
a second vacuum port through said grip, said second vacuum port being aligned with said vacuum channel for applying said vacuum to the interior of said grip;
a first O-ring positioned between said sleeve and said piston for sealing against vacuum leaks between said sleeve and said piston; and
a second O-ring positioned between said grip and said sleeve for sealing against vacuum leaks between said rotatably mounted grip and said sleeve.

20. A device for moving and positioning an assembly component in an automated assembly operation, as claimed in claim 19, wherein:
said first O-ring is mounted in a first annular groove on an outside diameter of said sleeve; and
said second O-ring is mounted in a second annular groove on an outside diameter of said grip.

21. A device for moving and positioning an assembly component in an automated assembly operation, as claimed in claim 19, further comprising:
a third O-ring positioned between said sleeve and said piston for sealing against vacuum leaks between said sleeve and said piston, said first vacuum port being positioned between said first O-ring and said third O-ring; and
a fourth O-ring positioned between said grip and said sleeve for sealing against vacuum leaks between said rotatably mounted grip and said sleeve, said second vacuum port being positioned between said second O-ring and said fourth O-ring.

* * * * *